Nov. 1, 1949  P. I. COLE  2,486,928
FLUID SEAL
Filed Sept. 9, 1946
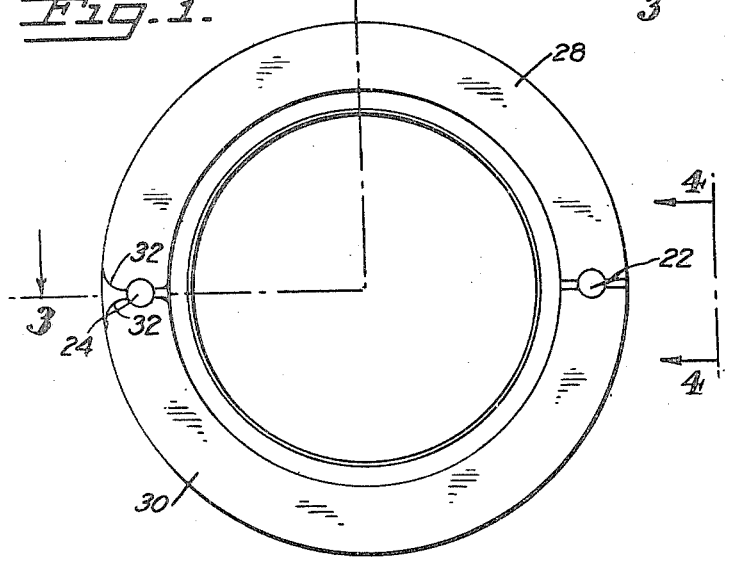
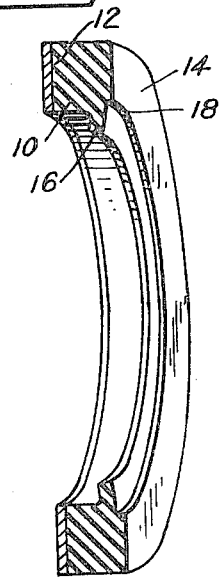
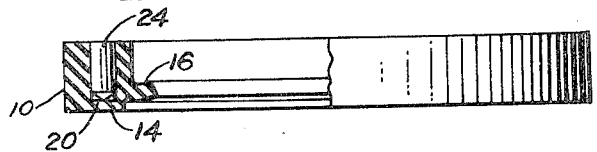
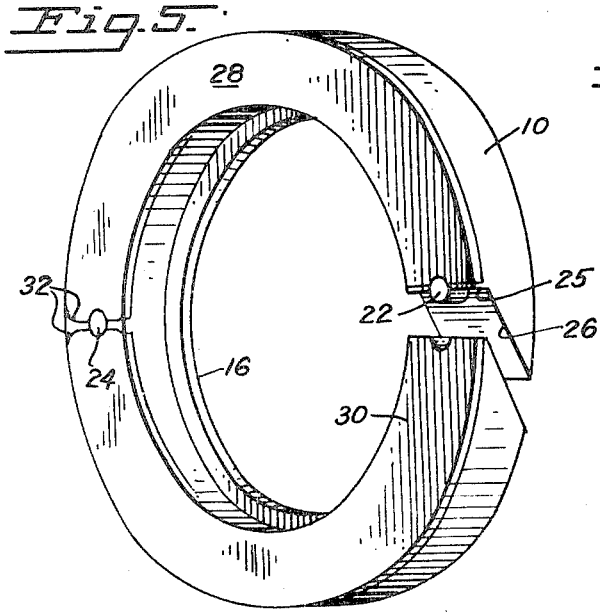
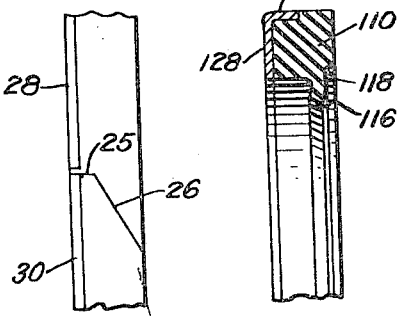
INVENTOR.
PRENTISS I. COLE
BY *Taylor and Lacagne*
ATTORNEY Patented Nov. 1, 1949

2,486,928

UNITED STATES PATENT OFFICE 2,486,928

FLUID SEAL

Prentiss I. Cole, Palo Alto, Calif.

Application September 9, 1946, Serial No. 695,665

6 Claims. (Cl. 288—3)

This invention relates to fluid seals, and more particularly to a fluid seal of the split washer type.

Where crankcases are divided or split on the axis of the crankshaft, it is not feasible to sleeve an oil seal over the end of the shaft. In such cases the seal must be split so that it may be opened and slipped over the shaft, and then the seal is positioned by press-fitting the seal within the crankshaft bore.

Conventional seals of this type are made by cutting a sheet-metal washer in half, adjusting the washer halves in a mold so that the ends of the halves are sufficiently spaced apart to compensate for the metal lost in cutting, bonding a rubber sealing element to the washer halves, whereupon rubber flows between the slightly separated ends of the washer halves, and cutting through the rubber between one pair of washer ends only. The seal may then be opened at the split, placed on a shaft, and press-fitted into the bore to firmly position the seal. In the press-fitting operation, the rubber between the spaced apart ends of the washer halves, equal in width to the metal lost in the cutting of the washer, is compressed. After slight usage of the seal, the compressed rubber becomes set, losing its resilient properties tending to urge the washer halves into tight engagement with the bore, with the result that the seal loses its fit in the bore and becomes loose. In time, the seal becomes loose enough to turn with the shaft and case leaks become so prominent that the seal is no longer usable.

I have devised a washer-type split seal having none of the deficiencies of the conventional type of split seal above-described and having the equivalent retentivity when press-fitted into a bore as a non-split washer type seal.

The object of the invention, therefore, is to provide a fluid seal of the split type having a press-fitted retentivity in a bore equivalent to that of a non-split seal of the same configuration.

Other objects and advantages of the invention will be readily apparent from the following description taken in conjunction with the drawing forming part of this specification, and in which—

Fig. 1 is a plan view of the fluid seal embodied in the invention;

Fig. 2 is a view in perspective of a diametral section of the seal of Fig. 1;

Fig. 3 is a view, partly in section, taken along lines 3—3 of Fig. 1;

Fig. 4 is a view along lines 4—4 of Fig. 1, showing the parting line of the split seal;

Fig. 5 is a view in perspective of the seal demonstrating the manner in which the seal may be opened for positioning on a shaft; and Fig. 6 is a partial cross-sectional view of a fluid seal having a metal retainer member of modified form.

Referring to the drawing for more specific details of the invention, an annular rubber web 10 having oppositely disposed faces 12 and 14 supports a sealing lip 16 offset from the web face 14 the width of a shoulder 18. The web has diametrically disposed holes 20 extending substantially the depth of the web, and pins 22 and 24 of the same diameter as the holes are adapted to be received therein. The web is cut through at one of the pin positions, the parting line having a portion 25 normal to the face 12 of the web and a portion 26 angularly inclined therewith so as not to expose the full length of the pin 22 when the web is spread open.

Bonded to the face 12 of the web 10 are sheet metal washer halves 28 and 30 comprising together an annular retainer member having indentations at each end, the radius of curvature of said indentations being equal to the radius of pins 22 and 24. Each of the washer halves 28 and 30 has a filleted portion 32, while, filling the space between each pair of washer ends, and flush with the upper surface of the washer halves and the upper ends of the pins 22 and 24, are protruding portions of rubber integral with the web 10.

The method of producing the seal is as follows: oppositely disposed holes, equal in diameter to the pins 22 and 24 are drilled in the center of a washer; the washer is cut in half to bisect both drilled holes, thereby providing washer halves 28 and 30 having ends spaced apart a distance equal to the metal lost in the cutting operation; the ends of the washer halves 28 and 30 are then filleted at 32; the washer halves, after being coated on one side with a thermosetting cement, are placed in a mold having fixed pins similar in size and location to pins 22 and 24; a piece of uncured rubber of suitable size is placed in the mold over the washer halves; the mold is closed and, under heat and pressure, the rubber is molded, cured, and bonded to the washer halves; the seal is removed from the mold; the parting line portions are cut in the web 10, no rubber being lost in the cutting operation as in the cutting of the metal washer; and pins 22 and 24 are inserted in the cavities provided by the mold pins.

The resultant seal may be opened at the parting line, as shown in Fig. 5, whereupon the pin 24 serves as a hinge, and the filleted portions 32 of the washer halves enable the hinge action to proceed with no locking of the washer halves. When the seal is placed on a shaft and press-fitted to abut the end-face of the bore, the shoulder 18 allows a free, uniform distortion of the sealing lip 16 on the slightly over-size shaft with no danger of the lip contacting the end-face of the bore.

It is thus seen that the split seal described may be accurately produced to conform to the dimensions of a calculated press-fit, no great care being necessary in the cutting of the washer as to the amount of metal removed, as long as the width of the cut is less than the diameter of the pins 22 and 24. The seal, after insertion of the pins 22 and 24, has the same resistance to compression as a non-split washer type seal and, consequently, has the equivalent retentivity of a non-split seal in a bore.

Fig. 6 illustrates a modification of the cross-sectional contour of the metal retainer member or washer, each washer half having a flange 134 adapted to enhance the rigidity, or resistance to buckling, when the seal is press-fitted into a bore. Also, the increased metal-to-metal contact between the flange 134 and the bore, over the rim contact of washer halves 28 and 30 of Figs. 1-5 and the bore, serves to inhibit the tendency of the seal to turn within the bore when the seal is installed on high-torque shafts. The flange 134 may be extended the width of web 110 so that there is solely metal-to-metal contact between the seal and bore, although it is well to retain a certain amount of rubber to bore contact to take advantage of the gasket effect produced thereby at the end-face of the bore. Elements 116, 118 and 128 correspond, respectively, and are similar to sealing lip 16, shoulder 18, and washer half 28 of Figs. 1-5.

While the preferred embodiment of the invention has been shown and described, it is understood that the invention is limited solely by the scope of the appended claims.

What I claim as new and desire to secure by Letters Patent is:

1. A fluid seal comprising a bisected annular retainer member, an annular web secured thereto and split adjacent one of the parting lines of the retainer member, and non-flexible means carried between the ends of the retainer member adapted to resist distortion of the retainer member when said seal is placed under radial compression.

2. A fluid seal comprising a bisected annular retainer member having adjacent ends spaced apart a distance equal to the width of the bisecting cut, an annular flexible web secured to the retainer member, a split through the web between one pair of retainer member ends, and non-flexible means carried by the web and extending between the ends of the retainer member adapted to resist distortion of the retainer member when said seal is placed under radial compression.

3. A fluid seal comprising a bisected annular metal retainer member having two pairs of adjacent ends spaced apart a distance equal to the width of the bisecting cut, an annular flexible web secured to the retainer member having portions extending into the spaces between the ends of the retainer member, a parting line in the web between one pair of retainer member ends and extending through the web, and rigid means between the ends of the retainer member in engagement with said ends and carried by the web adapted to preserve the annularity of the retainer member when said seal is placed under radial compression.

4. A fluid seal comprising a bisected annular metal retainer member having two pairs of adjacent ends spaced apart a distance equal to the width of the bisecting cut, an annular rubber web bonded to the retainer member, a pin embedded in the web between each pair of retainer member ends, matching indentations in each pair of said ends conforming to the abutting surface of the pins, and a parting line cut through the web between one pair of retainer member ends.

5. A fluid seal comprising a bisected annular metal retainer member having two pairs of adjacent ends spaced apart a distance equal to the width of the bisecting cut, an annular rubber web bonded to the retainer member, a pin circular in cross section embedded in the web between each pair of retainer member ends, matching arc-like indentations in each pair of retainer member ends adapted to fit the abutting peripheral surface of the pin therebetween, and a parting line cut through the web between one pair of retainer ends and angularly inclined away from the pin to prevent disclosing the full length of said pin upon the opening of the seal on said parting line for placements on a shaft, said opening being facilitated by the hinge action provided by the oppositely disposed pin and filleted outer edges of the ends of the retainer member adjacent thereto.

6. A fluid seal comprising a bisected annular retainer member having two pairs of adjacent ends spaced apart a distance equal to the width of the bisecting cut, the outer edges of the ends of one of said pairs being filleted, an annular flexible web bonded to the retainer member, a pin embedded in the web between each pair of retainer member ends, indentations in each of the ends of each pair conforming to the abutting surface of the pins, and a parting line in said web at least in partial alignment with the space between that pair of retainer member ends opposite to the filleted pair of ends to allow for the opening of said seal for placement on a shaft, said opening of the seal being facilitated by the hinge action provided by the oppositely disposed pin and the filleted edges of the retainer member.

PRENTISS I. COLE.

REFERENCES CITED

The following references are of record in the file of this patent:

UNITED STATES PATENTS

| Number | Name | Date |
| --- | --- | --- |
| 1,662,707 | Hosmer | Mar. 13, 1928 |
| 2,124,015 | Stone et al. | July 19, 1938 |